US008200456B2

(12) United States Patent
Marik et al.

(10) Patent No.: US 8,200,456 B2
(45) Date of Patent: Jun. 12, 2012

(54) SYSTEM FOR MULTIDIMENSIONAL DATA-DRIVEN UTILITY BASELINING

(75) Inventors: Karel Marik, Revnice (CZ); Josef Rieger, Jilemnice (CZ)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 12/038,095

(22) Filed: Feb. 27, 2008

(65) Prior Publication Data

US 2009/0216469 A1  Aug. 27, 2009

(51) Int. Cl.
*G01R 21/06* (2006.01)
*G01R 27/00* (2006.01)
*G06F 11/30* (2006.01)
*G21C 17/00* (2006.01)

(52) U.S. Cl. .............. 702/188; 702/60; 702/61; 702/62; 702/65; 702/182; 700/291

(58) Field of Classification Search ............. 702/60, 702/61, 62, 65, 182, 188
See application file for complete search history.

(56) References Cited

U.S. PATENT DOCUMENTS

| 5,717,609 | A  * | 2/1998 | Packa et al. .................. 702/130 |
| 6,785,592 | B1   | 8/2004 | Smith et al. |
| 2001/0020219 | A1 * | 9/2001 | Kishlock et al. ................ 702/61 |
| 2004/0111226 | A1 * | 6/2004 | Brewster et al. ................ 702/61 |
| 2005/0065743 | A1 * | 3/2005 | Cumming et al. ............. 702/62 |
| 2006/0167591 | A1   | 7/2006 | McNally |
| 2007/0143045 | A1   | 6/2007 | MacGregor |
| 2008/0143527 | A1 * | 6/2008 | Lastinger et al. ............ 340/547 |

OTHER PUBLICATIONS

Local Regression, Wikipedia, Feb. 10, 2008.

\* cited by examiner

*Primary Examiner* — Janet Suglo
(74) *Attorney, Agent, or Firm* — Kermit D. Lopez; Luis M. Ortiz; Kevin Soules

(57) ABSTRACT

A system for utility base lining records historic values of utility loads for regions within a facility. The system also records historic values of independent variables such as outside temperature, time, date, workday versus non-workday, and occupancy. A similar data selector seeks out similar times in the past and submits the data from those times to a base line estimator which produces a baseline estimate. Differences between the current load and the estimated load can trigger alarms or investigations to determine why the utility load has changed. False alarms can occur when the utility load drifts over time. Detecting drift can help reduce false alarms or help in the investigation of alarms. A graphical user interface (GUI) can present an easily understood representation of the regions, load estimation errors, alarms, and detected drift.

19 Claims, 5 Drawing Sheets

SYSTEM FOR MULTIDIMENSIONAL DATA-DRIVEN UTILITY BASELINING

TECHNICAL FIELD

Embodiments relate to buildings, rooms, power consumption, resource utilization, and to decision and estimation techniques. Embodiments also relate to graphical user interfaces and remote metering. Embodiments yet further relate to the fields of system modeling, linear regression, and local regression.

BACKGROUND OF THE INVENTION

Buildings use and consume a variety of resources such as electricity, water, gas, and steam. These resources are more commonly referred to as utilities. Many facilities control utility consumption through a system of controllers. For example, thermostats placed around a building can regulate the temperature of regions within the building.

Utilities are often metered at the point where they enter buildings and readings of the meters indicate how much of the utility has been consumed. In many systems, a person reads the meter at two different times and then determines the buildings consumption during the period encompassed by those two times. More recently, remote metering capabilities have removed the person from the process. Meters can be connected to a communications network such that computers can remotely query the meters.

Those practiced in the art of linear regression and local regression are familiar with modeling techniques such as LOESS. A data set can contain numerous samples of the values of independent variables and of dependent variables that depend on those independent variables. Techniques such as LOESS can produce a model of the data set. When given values for the independent variables, the model can produce an estimates of the dependent variables and their variances. The variance estimates are an indication of how "noisy" the dependent variable estimates are.

In an effort to conserve resources, historical data can be examined in an effort to determine trends in utility consumption. Systems and methods for analyzing resource utilization are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to obtain load measurements indicative of resource utilization within the regions of a building. Time stamping the load measurements and storing them results in a database of historical load measurements.

It is also an aspect of the embodiments to measure the values of independent variables such as outside air temperature, date, time of day, occupancy, and workday versus non-workday. The independent variable measurements can also be time stamped and stored in the database with the caveat that time and date data typically time stamps itself. As such, the database contains historical data. The historical data is a record over time of resource usage and of independent factors that can affect resource usage. Deploying multiple sensors throughout a building allows measurements to be made in the various regions and rooms within the building.

It is a further aspect of the embodiments that a similar data selector can be supplied with a selection of independent variable measurements. The similar data selector then obtains similar historical data from the database indicating resource usage during similar time periods. Note that a similar time period is one having similar conditions in general but not necessarily occurring during a similar time of day. For example, submitting "noon and 40 degrees outside" to the similar data selector can result in the return of all the load measurements for every building region when the temperature was between 35 and 45 degrees and the time was between 11 AM and 1 PM.

It is a further aspect of the embodiments that the similar historical data is analyzed to produce baseline mean estimates and baseline variance estimates. The baseline mean estimate for a region is an indication of what the load measurement is expected to be based on prior observations. The baseline variance is an indication of how precise the baseline mean estimate is.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

A system for utility base lining records historic values of utility loads for regions within a facility. The system also records historic values of independent variables such as outside temperature, time, date, workday versus non-workday, and occupancy. A similar data selector seeks out similar times in the past and submits the data from those times to a base line estimator that produces a baseline mean estimate and a baseline variance estimate. Differences between the current load and the baseline mean estimate can trigger alarms or investigations to determine why the utility load has changed. More specifically, the error is the difference between the baseline mean estimate and the current load. The ratio between the magnitude of the error and the baseline variance estimate indicates if the current load is anomalous and, if so, the magnitude of the anomaly. The local data selector can have a built in bias for more recent data. In such a case, the estimates are not sensitive to slowly drifting load. Otherwise, false alarms can occur when the utility load drifts over time. Detecting drift or immunity to drift can help reduce false alarms or help in the investigation of alarms. A graphical user interface (GUI) can present an easily understood representation of the regions, load estimation errors, load anomaly severity, alarms, and detected drift.

Figure 1:
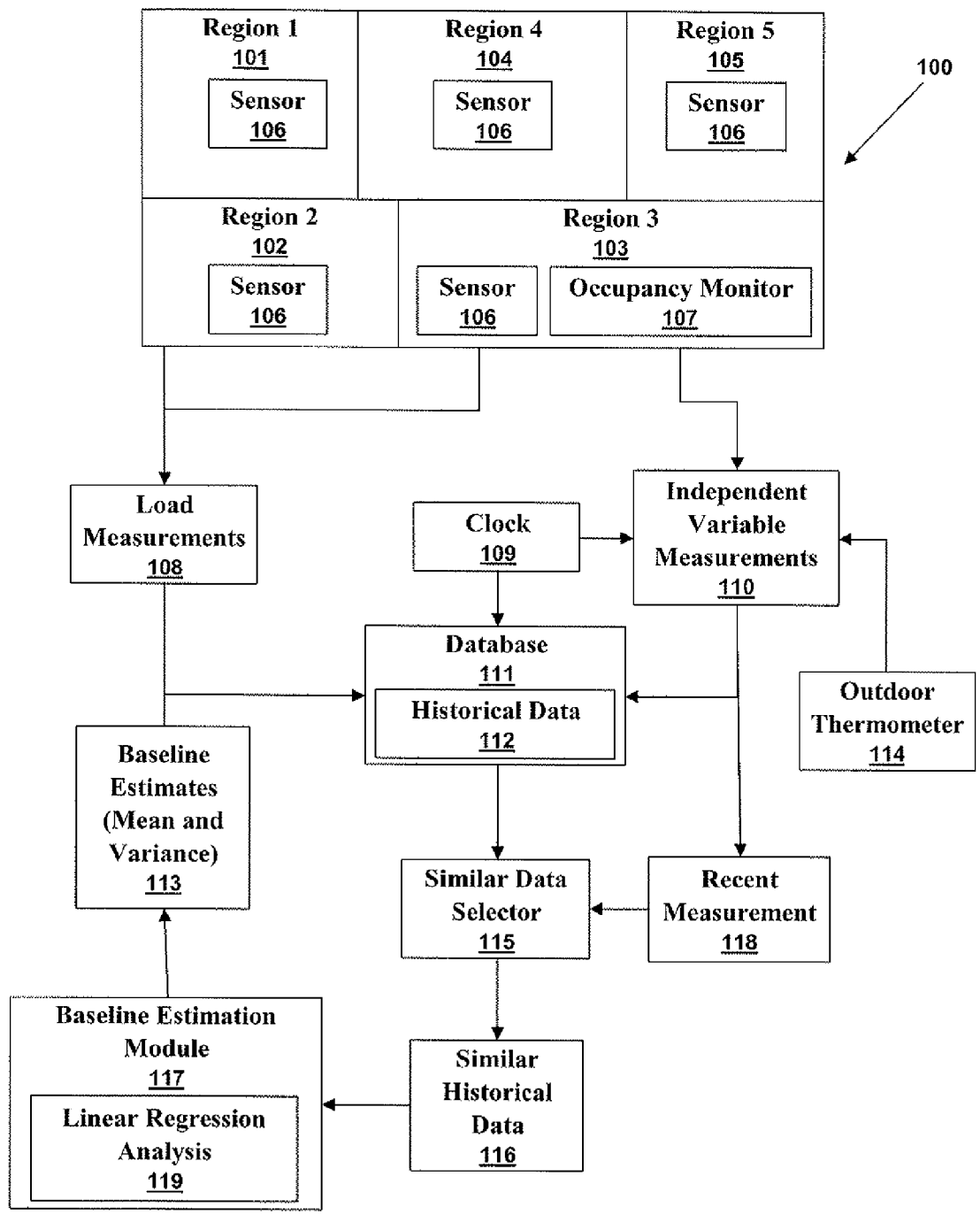
FIG. 1 illustrates a system producing baseline estimates for the regions of a facility in accordance with aspects of the embodiments.

FIG. 1 illustrates a system producing baseline mean and variance estimates 113 for the regions of a facility in accordance with aspects of the embodiments. A building 100 is divided into five regions 101-105. Each region has a sensor 106 that senses utility load such as electrical energy use, amount of heating, amount of cooling, or some other utility. The load sensors produce load measurements 108. Independent factors can affect the utility load. The independent factors can be observed as independent variables. For example. regions can have occupancy monitors 107 that detect the number of people in a region. An occupancy monitor can be part of an access control system, a system that detects people, a system that detects something people carry such as RFID tags, or some other system. An outdoor thermometer 114 can measure outside temperature. A clock 109 can supply a measurement of the current date and time. The independent variable sensors produce independent variable measurements 110 including outside temperature, occupancy, date, and time. The load measurements 108 and the independent variable measurements 110 can be stored as historical data 112 in a database 111.

A similar data selector 115 accepts a recent measurement 118 and produces similar historical data 116. The recent measurement 118 is a recently acquired set of independent variable measurements 110. The similar data selector 115 gathers similar historical data 116 which is historical data from past times that were similar to the recent measurement 118.

A baseline estimation module 117 analyzes the similar historical data 116 to produce baseline estimates 113. The baseline estimates 113 predict what the utility load should be based on the recent measurement 118. A linear regression model 119 can produce such an estimate. Those practiced in the art of linear algebra are familiar with linear regression. Furthermore, a weighted linear regression analysis is applied in many LOESS implementations after the selection of similar historical data. The baseline estimates 113 can be stored in the database for later processing, for visualization, or detection of anomalous energy demands.

Some systems, such as certain LOESS implantations, select similar historical data and also weight the similar historical data. As such, the more similar a particular historical data record is to the recent measurement, the more heavily it is weighted. The more heavily that data is weighted more greatly it effects the baseline estimates. More recent historical data can be weighted more heavily because the recent measurement contains a time and date. The recent data is closer along the time axis. This weighting can lead to a degree of drift immunity.

Figure 2:
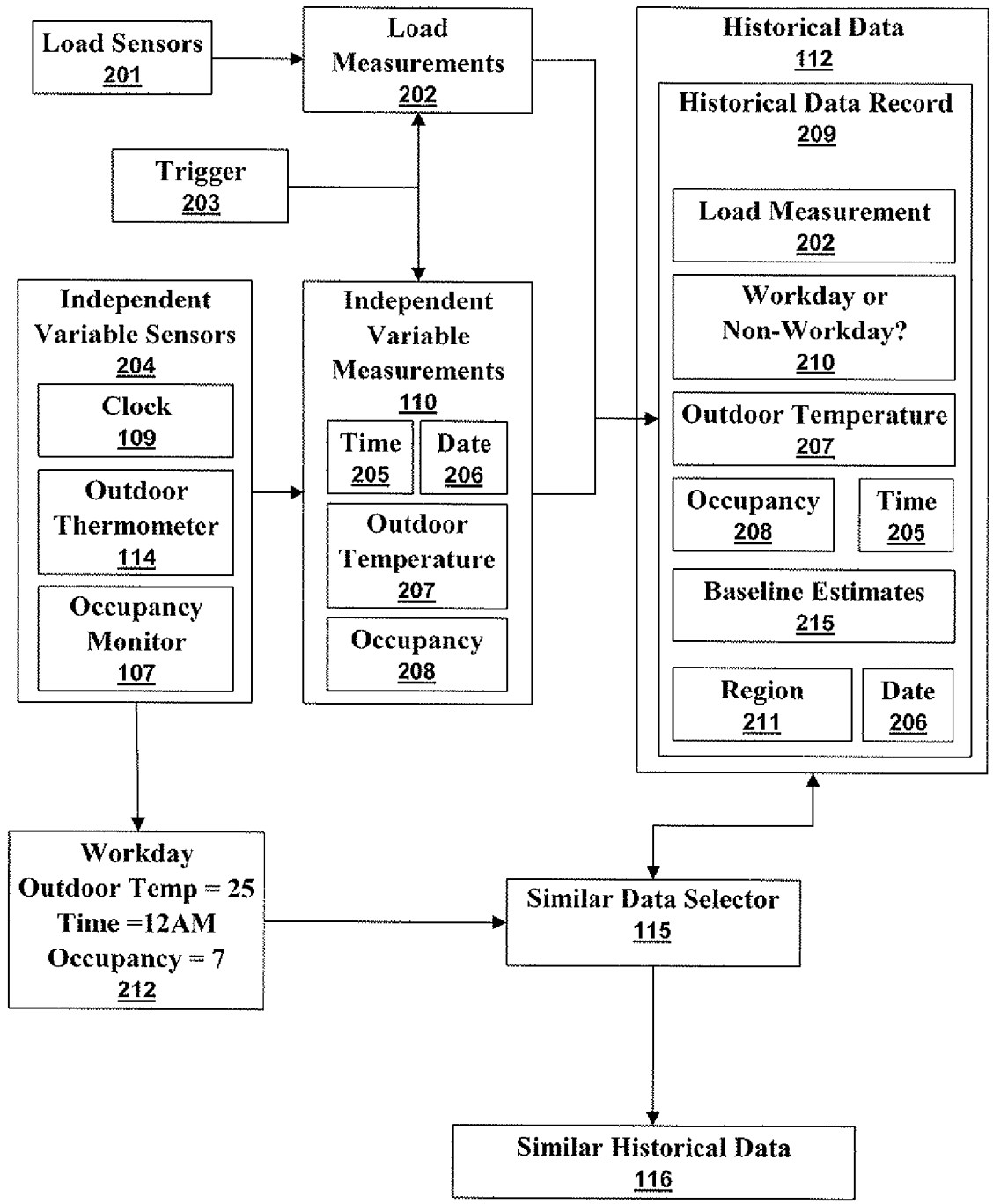
FIG. 2 illustrates a populated lead frame in accordance with aspects of the embodiments.

FIG. 2 illustrates a system producing similar historical data in accordance with aspects of the embodiments. A trigger 203 such as a periodic pulse, message, or command can cause load sensors 201 to produce load measurements 202 and independent variable sensors 204 to produce independent variable measurements 110. A clock 109 produces time 205 and date 206 measurements. An outdoor thermometer 114 measures outdoor temperature 207. An occupancy monitor 107 measures occupancy 208. The load measurements 202 and the independent variable measurements 110 can be stored in a historical data record 209 in the historical data 112. The date 206 can be used to set the workday or non-workday variable. For example, the trigger 203 can be periodic occurring every 10 minutes. The historical data 112 would thereby include independent variable measurements 110 and load measurements 202 taken at ten minute intervals. Note that the listed set of independent variables is an example of some of the influencing factors that can affect utility load. Baseline estimates can be produced when given the listed independent variables, a subset of them, or a different set of independent variables.

A recent measurement 212 is presented to the similar data selector 115. Here, the recent measurement is that it is 12 AM on a workday with an outside temperature of 25 with seven people in the region. Here the similar data selector 115 is a distance based similar data selector. The independent variables in the database can be formed into historical vectors. In a similar manner, the recent measurement can also be formed in a vector. The similar data selector can then use a distance measure, such as Euclidean distance, to choose the historical data that is close to, and thereby similar to, the recent measurement. Similarity measure is not limited to being derived from Euclidean distance; it could be defined using various techniques.

Figure 3:
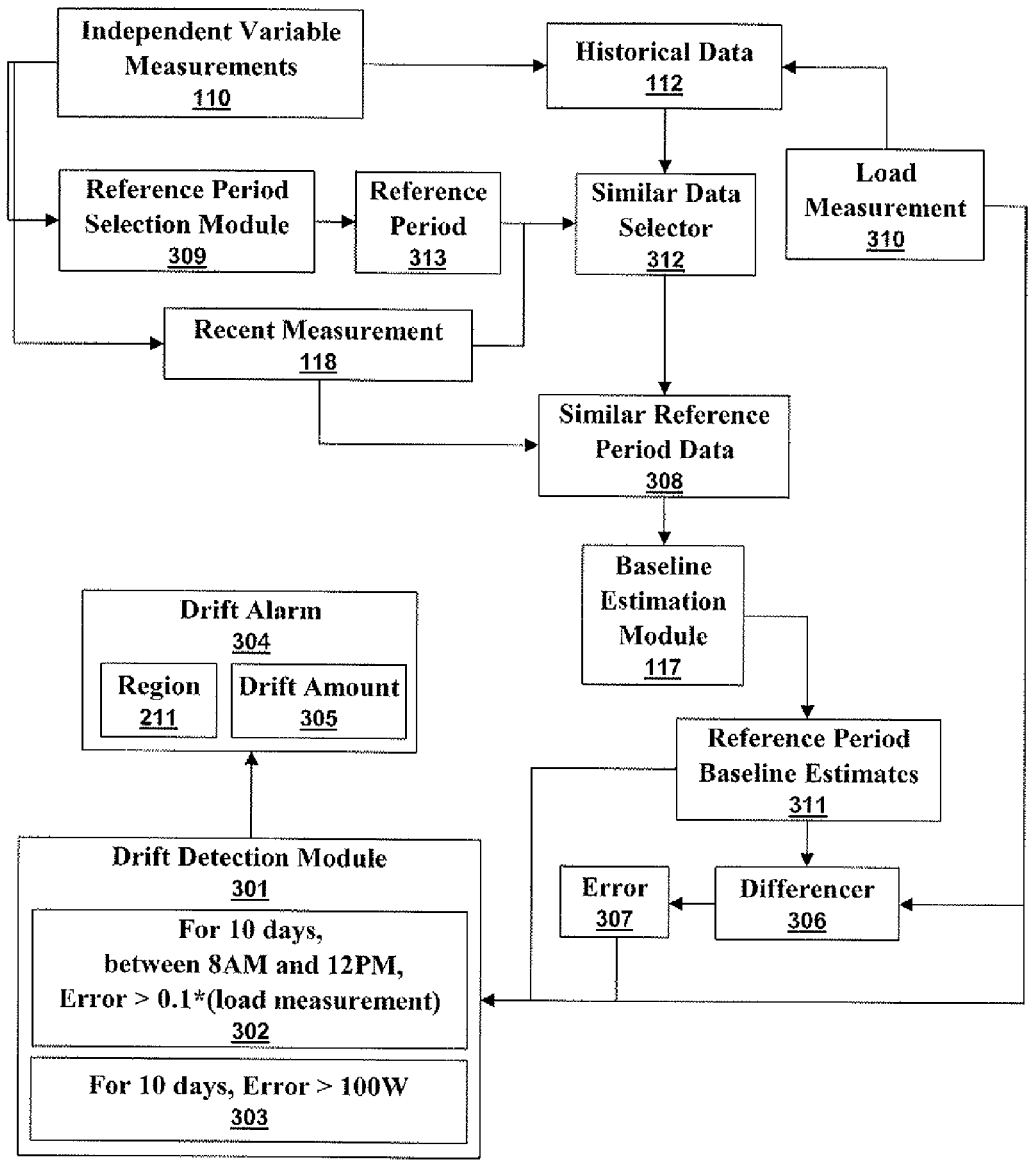
FIG. 3 illustrates a system detecting drift in accordance with aspects of the embodiments.

FIG. 3 illustrates a system detecting drift in accordance with aspects of the embodiments. Independent variable measurements 110 and load measurements are periodically stored as historical data. The independent variable measurements also result in the recent measurement 118. The recent measurement 118 is input to the similar data selector 312. The similar data selector 312 also accepts a reference period 313. The reference period can be produced by a reference period selection module. For example, the desired reference period can be "one year ago". In such an example, the reference period selection module can obtain the current date from the independent variable measurements 110 and produce the desired reference period 313 that is then passed to the similar data selector 312.

The similar data selector 312 can then produce similar reference period data 308 containing historical data obtained from times during the reference period. Note that certain weighted LOESS implementations can simply receive a past date. The weighted LOESS implementation can then simply weight historical data more strongly if it was taken near the past date. Passing the similar reference period data to the baseline estimation module results in which eventually leads to the production of reference period baseline estimates 311. The reference period baseline estimates 311 are baseline estimates produced from the reference periods historical data. A differencer 306 calculates the error 307 as the difference between the load measurement 310 and the reference period baseline mean estimate 311. The error can be stored in the database for future use.

A drift detection module 301 examines the error 307 to determine the occurrence of baseline drift. Baseline drift occurs when the utility load changes slowly over time. For example, a heater may become less efficient over a long period of time and cause the utility load to slowly increase. Recall that the baseline estimation module can be immune to slowly drifting load measurements. Detecting slowly drifting loads, however, can supply crucial information leading to the maintenance of slowly clogging filters or a degrading heater.

The illustrated drift detection module 301 is a rule based drift detection module 301. It has two rules. A first rule 302 finds drift when the error is greater than 10% for 10 days from 8 PM to 12 PM. The second rule 303 finds drift when the error exceeds 100 W for 10 days. For example, if the reference period is one year in the past, then the second rule tends to detect drift exceeding 100 Watts per year. Either rule can give rise to a drift alarm 304. A drift alarm can contain data such as the affected region 211 and the drift amount 305. The drift amount 305 can be the average error over an interval of time.

Figure 4:
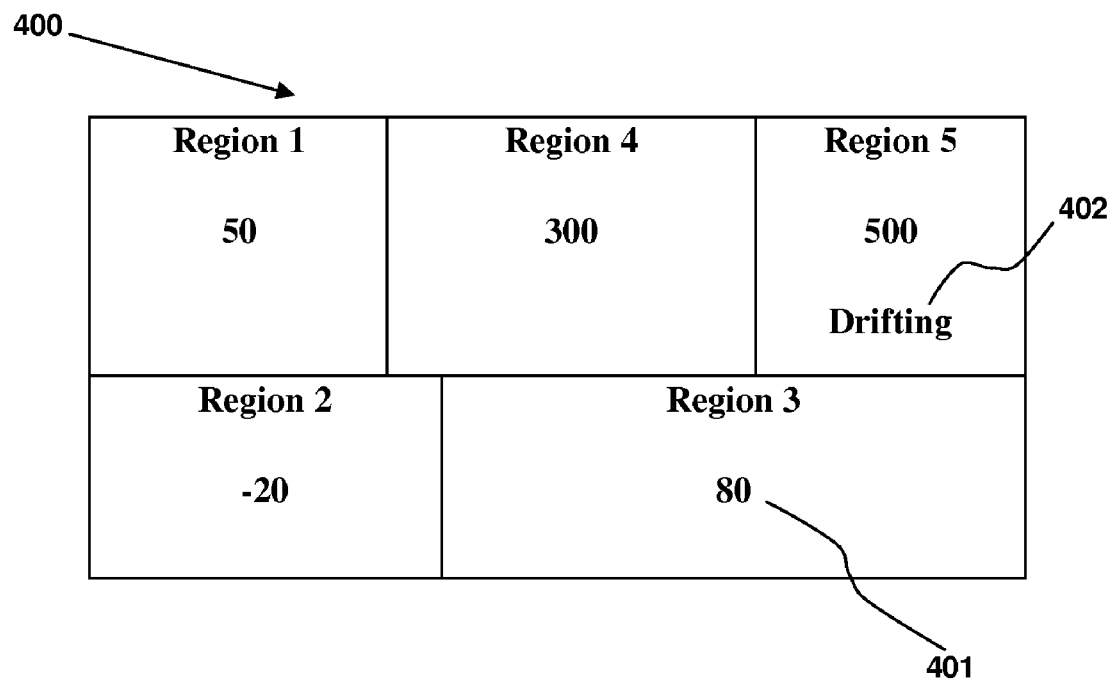
FIG. 4 illustrates a graphical user interface presenting load estimation errors and detected drift in accordance with aspects of the embodiments.

FIG. 4 illustrates a graphical user interface 400 presenting load estimation errors 401 and detected drift 402 in accordance with aspects of the embodiments. The GUI 400 can be presented on a computer monitor or similar display. As can be seen in comparison with FIG. 1, the GUI 400 can be a representation of the facility and the regions within the facility. Each region contains text fields identifying the region and showing the load estimation error 401. Another text field can appear to indicate drift 402.

Figure 5:
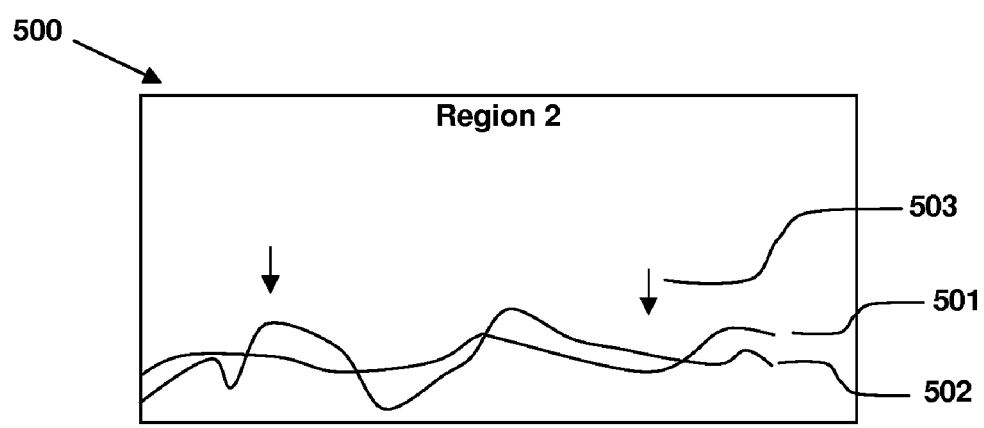
FIG. 5 illustrates a portion of a graphical user interface presenting load estimation errors and detected drift in accordance with aspects of the embodiments.

FIG. 5 illustrates a portion of a graphical user interface 500 presenting load estimation errors and detected drift in accordance with aspects of the embodiments. Here, only the representation of region 2 is illustrated. Alternatively, the entire facility can be shown with each region presented. Two chart lines are shown. The load line 501 indicates the actual measured utility load. The estimate line 502 indicates the baseline estimates. The vertical axis corresponds to load whereas the horizontal axis corresponds to time. The error can be observed as the amount of separation between the load line 501 and estimate line 502. Arrows 503 indicate that drift has been detected and at what time it was detected.

Figure 6:
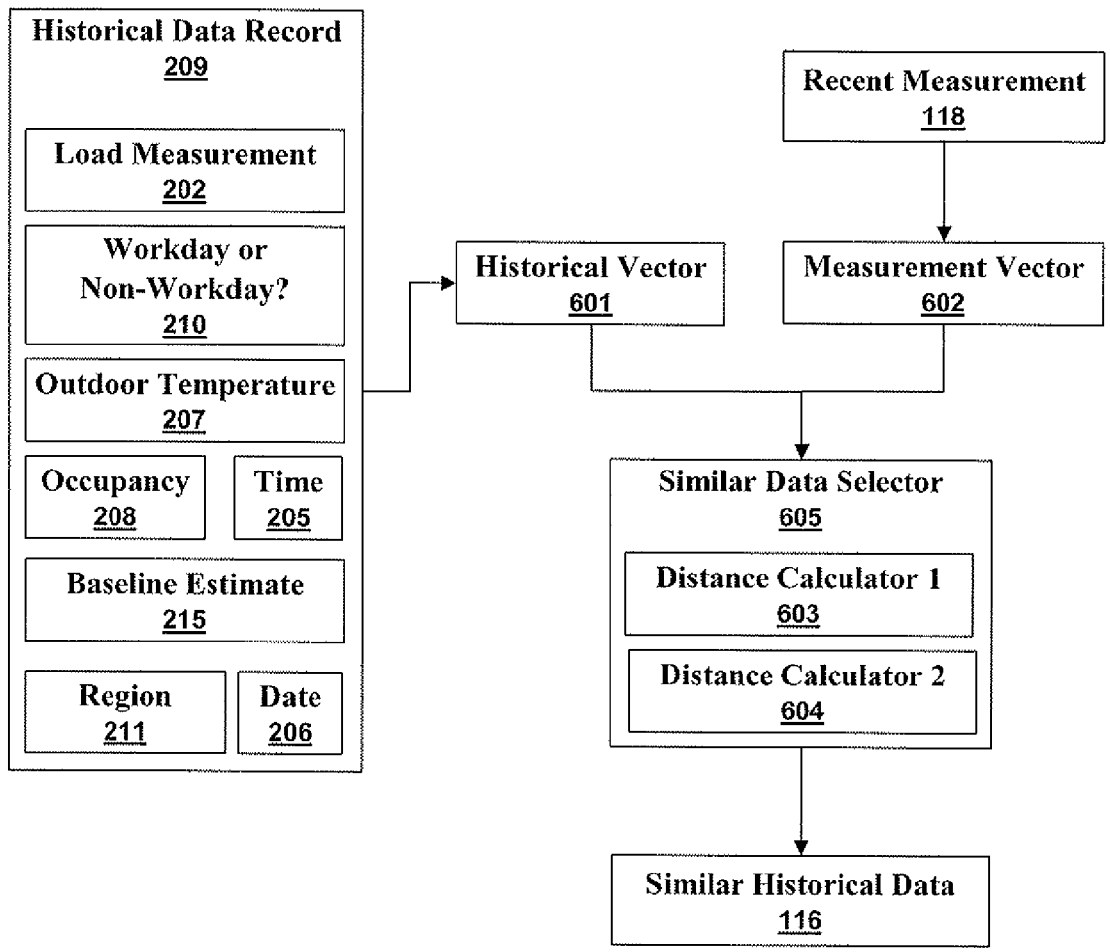
FIG. 6 illustrates a distance based similar data selector in accordance with aspects of the embodiments.

FIG. 6 illustrates a distance based similar data selector 605 in accordance with aspects of the embodiments. A historical data record 209 can be converted into a historical vector 601. In some embodiments, the historical data records are historical vectors that are stored as vectors in the database. Those familiar with linear algebra can convert a group of numbers, such as those in a historical data record 209, into a historical vector. Similarly, the recent measurement 118 can be expressed as a measurement vector 602. The similar data selector 605 can choose data based on the minimum distance between the historical vector 601 and the measurement vector 602. The distances are calculated by distance calculators.

Distance calculator 1 can calculate a Euclidean distance while only considering the values for occupancy and outside temperature. Distance calculator 2 can calculate a distance while considering only the values for time and workday v. non-workday (a flag). The similar data selector can choose all historical data within a threshold value for distance calculator 1 603 and within a different threshold value for distance calculator 2 604.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention what is claimed is:

1. A system comprising:
    a means for defining and identifying a plurality of regions in a facility;
    a plurality of sensors wherein each sensor produces a load measurement indicating the amount of energy currently consumed in one of the plurality of regions of the facility;
    a means for determining independent variable values wherein the independent variables comprise outdoor temperature, date, time of day, and regions of the facility;
    a means for computing a plurality of independent variable measurements indicating the values of the independent variables at different times and for computing a plurality of load measurements indicating values of sensed load measurements at different times;
    a database storing the load measurements and the plurality of independent variable measurements as historical data;
    a similar data selector wherein the similar data selector is a Euclidean distance based similar data selector that accepts a recent measurement and produces similar historical data from the historical data, wherein the similar historical data comprises load measurements and independent variable measurements taken when the independent variable measurements were similar to the recent measurement; and
    a baseline estimation module that accepts the historical load data set and produces at least one baseline estimate for the recent measurement.

2. The system of claim 1 further comprising a periodic trigger that triggers the production of the similar historical data set and the at least one baseline estimate on a set period.

3. The system of claim 1 wherein the independent variables further comprise workday versus non-workday.

4. The system of claim 1 wherein the independent variables further comprise occupancy.

5. The system of claim 1 wherein the baseline estimation module comprises a linear regression model.

6. The system of claim 1 further comprising a graphical user interface wherein the recent measurement is a current independent variable measurement such that the at least one baseline estimate is at least one current baseline estimate; and wherein the graphical user interface presents the plurality of regions with an indication of the difference between the current load measurement and the current baseline estimate for the plurality of regions.

7. A system comprising:
    a means for defining and identifying a plurality of regions in a facility;
    a plurality of sensors wherein each sensor produces a sensed load measurement indicating the amount of energy currently consumed in one of the plurality of regions of the facility;
    a means for determining independent variable values wherein the independent variables comprise outdoor temperature, date, time of day, and regions of the facility;
    a means for computing a plurality of independent variable measurements indicating the values of the independent variables at different times and for computing a plurality of load measurements indicating values of sensed load measurements at different times;
    a database storing the load measurements and the independent variable measurements as historical data;
    a similar data selector that accepts a recent measurement, wherein the similar data selector is a Euclidean distance based similar data selector and a reference period and produces similar reference period data from the historical data;
    a baseline estimation module that accepts the similar reference period data and produces at least one reference period baseline estimate for the recent measurement;

a drift detection means for identifying baseline drift by comparing the reference period baseline estimates to the load measurements, wherein said baseline drift is a difference that slowly changes over a given time period such that said difference will not be recognizable upon short term comparisons of baseline estimates to on-going load measurements.

8. The system of claim 7 further comprising at least one drift detection rule wherein the drift detection means comprises a rule based drift detection means.

9. The system of claim 7 wherein the independent variables further comprise workday versus non-workday.

10. The system of claim 7 wherein the independent variables further comprise occupancy.

11. The system of claim 7 wherein the baseline estimation module comprises a linear regression model.

12. The system of claim 7 further comprising a graphical user interface that presents the at least one region with an indication of the difference between the load measurements and the baseline estimates for the plurality of regions.

13. The system of claim 7 further comprising a graphical user interface that indicates the presence of baseline drift in any of the plurality of regions.

14. The system of claim 7 further comprising:
- at least one drift detection rule wherein the drift detection means comprises a rule based drift detection means;
- at least one data selection rule wherein the similar data selector is a rule based similar data selector;
- a graphical user interface that presents the at least one region with an indication of the difference between the load measurements and the baseline estimates for the at least one region and wherein the graphical user interface also indicates the presence of baseline drift in any of the plurality of regions;
- wherein the independent variables further comprise workday versus non-workday and building occupancy; and wherein the baseline estimation module comprises a linear regression model.

15. The system of claim 7, further comprising a drift alarm containing a drift amount within an affected region of said facility wherein said drift amount is an average error over an interval of time, such that said drift alarm is triggered when said drift amount is above a preselected value.

16. A system comprising:
- a means for defining and identifying a plurality of regions in a facility;
- a means for obtaining a plurality of load measurements for the plurality of regions and covering a plurality of time periods for each region wherein each load measurement is an indication of the amount of energy consumed in one region over a known time period;
- a means for storing the load measurements;
- a means for obtaining a plurality of independent variable measurements corresponding to the values of independent variables at known times wherein the independent variables comprise outdoor temperature, date, and time of day, and regions of the facility;
- a means for storing historical data comprising the load measurements and independent variable measurements;
- a means for selecting historical data that accepts a recent measurement and produces similar historical data wherein said means for selecting historical data uses a Euclidean distance based selector and
- a means for producing at least one baseline estimate.

17. The system of claim 16 further comprising a means for determining baseline drift.

18. The system of claim 17 further comprising a means for displaying the baseline drift.

19. The system of claim 16 further comprising a means for displaying the difference between the load measurements and the baseline estimates.

* * * * *